(12) United States Patent
Deker

(10) Patent No.: US 6,173,219 B1
(45) Date of Patent: Jan. 9, 2001

(54) METHOD FOR AUTOMATICALLY CONTROLLING A VEHICLE FOR THE LATERAL AVOIDANCE OF A FIXED ZONE

(75) Inventor: Guy Deker, Chaville (FR)

(73) Assignee: Sextant Avionique, Velizy Villacoublay (FR)

( * ) Notice: Under 35 U.S.C. 154(b), the term of this patent shall be extended for 0 days.

(21) Appl. No.: 09/147,355

(22) PCT Filed: Jun. 3, 1997

(86) PCT No.: PCT/FR97/00971

§ 371 Date: Dec. 30, 1998

§ 102(e) Date: Dec. 30, 1998

(87) PCT Pub. No.: WO97/47947

PCT Pub. Date: Dec. 18, 1997

(30) Foreign Application Priority Data

Jun. 7, 1996 (FR) .................................................. 96 07077

(51) Int. Cl.[7] .................................. G06F 17/00; G06F 7/00
(52) U.S. Cl. ............................. 701/3; 701/120; 701/226; 701/301; 701/201; 244/75 R
(58) Field of Search ............................. 701/7, 9, 11, 13, 701/14, 15, 16, 120, 200, 201, 226, 300, 301, 302, 3, 23; 244/75 R, 158 R; 340/945, 961

(56) References Cited

U.S. PATENT DOCUMENTS

| | | | | |
|---|---|---|---|---|
| 5,555,175 | * | 9/1996 | D'orso | 701/301 |
| 5,581,250 | * | 12/1996 | Khvilivitzky | 701/301 |
| 5,838,262 | * | 11/1998 | Kershner et al. | 701/301 |
| 5,872,526 | * | 2/1999 | Tognazzini | 701/301 |

FOREIGN PATENT DOCUMENTS 0 381 178 A1    8/1990 (EP) .
WO 95/19547    7/1995 (WO) .

* cited by examiner

*Primary Examiner*—William A. Cuchlinski, Jr.
*Assistant Examiner*—Gertrude Arthur
(74) *Attorney, Agent, or Firm*—Oblon, Spivak, McClelland, Maier & Neustadt, P.C.

(57) ABSTRACT

A method for laterally avoiding a fixed zone in an aircraft. The contour of the zone to be avoided is modeled by a convex polygon shape. The planned route is located with respect to the modeled zone. The port and starboard sections of the route for exit and return of the planned route are computed. A predetermined angle is formed which meets with a corner point of the contour to obtain two avoidance routes formed by the exit and return sections of the route and by the portions of the contour. One of the two avoidance routes is then selected.

20 Claims, 3 Drawing Sheets

METHOD FOR AUTOMATICALLY CONTROLLING A VEHICLE FOR THE LATERAL AVOIDANCE OF A FIXED ZONE

BACKGROUND OF THE INVENTION

1. Field of the Invention

The present invention relates to a method for the automatic piloting of a vehicle allowing the lateral avoidance of a fixed zone, for example a zone which it is forbidden to traverse.

2. Discussion of the Background

It applies in particular, but not exclusively, to the automatic piloting of an aerodyne whose initially planned route traverses a fixed zone with predefined contours which must be bypassed, while entry thereto is prohibited.

Such a situation occurs for example when, during the flight, the pilot receives a message prohibiting him from overflying a zone situated on his route. Such cases arise in particular when there is a prohibition to overfly a zone of air space, such as a military zone or a state.

Such information is, for example, received by the aerodyne by way of a device for transmitting digital data, for example a Data-Link, and has been sent by a ground station. The contours of the zone to be avoided figure within the on-board documentation, or else are transmitted by the ground station.

Currently, it is up to the pilot to handle the problem manually, by carrying out avoidance within sight of the zone, these operations having to take account of a considerable number of parameters, and in particular, of the regulations in force within the air space traversed, of the performance of the aerodyne, and of the weight of fuel in its tanks. Moreover, it may happen that the pilot receives such information only a very short time before entering the prohibited zone, and in many cases, this time is insufficient to enable him to take into account all the necessary parameters for determining the best avoidance trajectory.

SUMMARY OF THE INVENTION

The objective of the present invention is to eliminate these drawbacks. It is also aimed at determining the new route to be followed, while reducing as far as possible the distance to be travelled. For this purpose, it proposes a method for the automatic piloting of a vehicle for the lateral avoidance of a fixed zone.

The method according to the invention is characterized in that it comprises the following steps in succession:

- the modelling of the contour of the zone to be avoided by a convex polygonal shape, by approximating the contour of the zone by a succession of segments, and eliminating the points of concavity and the excessively short segments,
- the locating of the planned route with respect to the modelled zone,
- the computation of port and starboard sections of route for exit and for return to the planned route, forming a predetermined angle with the latter and meeting up with the corner point of the polygonal shape closest to the planned route, so as to obtain two avoidance routes, port and starboard, formed by the exit and return sections of route and by the portions of the modelled contour respectively connecting the port and starboard exit and return transition sections of route, and
- the selection of one of the two avoidance routes, port or starboard as a function of a predetermined criterion.

By virtue of these provisions, the pilot is completely unburdened of the job of modifying the flight plan and the piloting of the aerodyne with a view to avoiding the prohibited zone. Furthermore, the new route has been optimized by reducing as far as possible the distance to be travelled.

The present invention also relates to an optimized method for changing heading in order to bypass the prohibited zone modelled by a convex polygonal shape, that is to say, with compulsory overflying of the change of heading point and prohibition to enter the zone inside the turn.

Currently, these heading changes are made with a predetermined constant turning radius, for example one which depends on the speed of the aerodyne, in such a way as to retain a constant angle of roll. To comply with a predetermined turning radius, it is therefore necessary to commence the turn at the moment at which the transit point is overflown, in which case the aerodyne will, after overflying the transit point, lie outside the planned turn and will then have to follow a trajectory intended to meet up with the initially planned route.

It transpires, as represented in FIG. 4, that during its change of heading $\Delta 104$, at the moment at which the transit point is overflown, the aerodyne strays significantly from the planned route R1, R2, and is even a relatively large distance d from it, which on the one hand causes a relatively large lengthening of the trajectory and on the other hand is undesirable in relation to surveillance and air control (compliance with variable lateral width margins).

To eliminate these drawbacks, the piloting method according to the invention comprises, at each corner point of the convex polygonal contour of the zone to be avoided, the computation and following by the vehicle of a curved change of heading trajectory passing through the said corner point, whose turning centre lies on the interior bisector of the angle formed by the two rectilinear portions of route which meet up at the corner point.

Such a change of heading trajectory offers numerous advantages by comparison with the trajectory of the prior art illustrated by FIG. 4. This is because it makes it possible to save several seconds (up to 35 seconds or 4.5 nautical miles for a 90-degree turn). It deviates less from the planned route defined by the rectilinear sections of route (less than 30% of the deviation incurred by the conventional transition trajectory), this being of considerable benefit in respect of surveillance and air control. It also carries less risk of culminating in a linked succession of turns which criss-cross if the segments of route are short.

Moreover, if this change of heading trajectory is compared with the conventional trajectory which consists of a tangent curve to the two portions of route, which is situated inside the turn, it is observed that the trajectory according to the invention deviates less from the portions of route than the conventional trajectory.

Advantageously, the method according to the invention comprises the computation and following of two portions of curved linking trajectory, respectively between the first portion of route and the change of heading trajectory, and between the latter and the second portion of route, these two portions of linking trajectory having the same radius of curvature as that of the change of heading trajectory, and being tangent to the latter and to the two portions of route respectively.

BRIEF DESCRIPTION OF THE DRAWINGS

An embodiment of the method according to the invention will be described below, by way of non-limiting example with reference to the appended drawings in which.

DETAILED DESCRIPTION OF THE PREFERRED EMBODIMENTS

Figure 1:
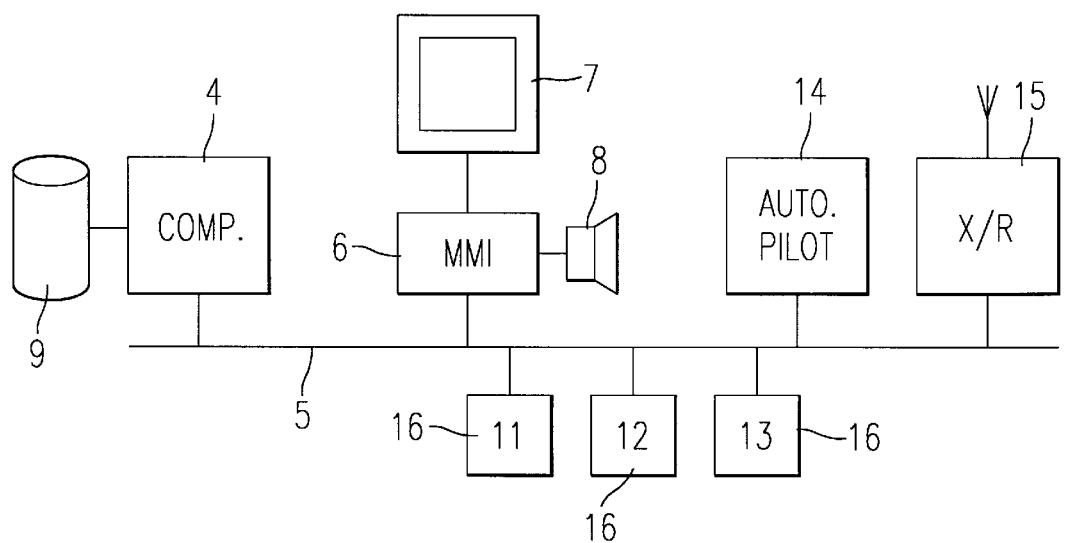
FIG. 1 diagrammatically represents the electronic equipment carried on board an aerodyne making it possible to implement the avoidance method according to the invention.

As represented in FIG. 1, the avoidance method according to the invention is particularly designed to be executed by a computer 4 installed on board an aerodyne, which is coupled by way of a data transmission bus 5, called the "aircraft bus", to the navigation equipment which includes an automatic piloting device 14 and navigation instruments 16, to a data transmission device 15, for example Data-Link, and also to a man/machine interface device (MMI) 6 comprising a control element and signalling elements, such as a display screen 7 and a loudspeaker 8 which are installed in the cockpit.

In a known manner, the automatic piloting device 14 comprises a memory in which is recorded the aerodyne's planned trajectory consisting of a succession of straight segments between the departure point and the destination point, and of transition trajectories making it possible to connect one segment to another.

The data transmission device 15 is able to receive information indicating that it is momentarily prohibited to overfly an air zone indicated for example by its name. Moreover, the computer 4 is for example coupled to a geographical navigational database 9 wherein are stored in particular the contours of the air zones of the territory normally overflown by the aerodyne. It is also possible for the pilot of the aerodyne himself to input the contours of the prohibited zone by means of the man/machine interface 6.

Figure 2:
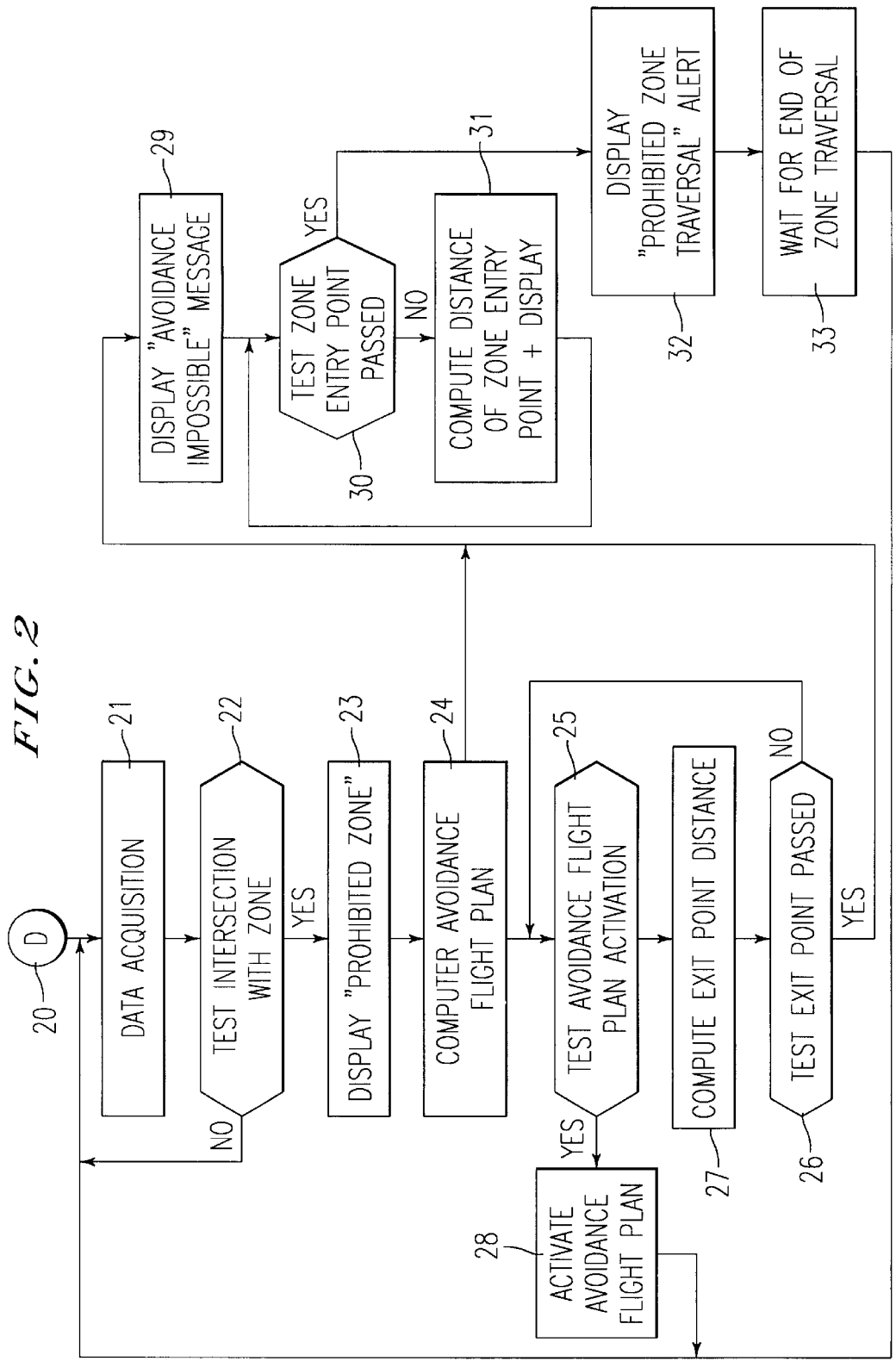
FIG. 2 diagrammatically shows the algorithm executed to implement the avoidance method.

The algorithm shown in FIG. 2 is executed by the computer 4 installed on board the aerodyne. It consists firstly in acquiring the data supplied by the data transmission device 15 and by the pilot by way of the man/machine interface device 6 (step 21).

When information relating to the prohibition to traverse an air zone is received, the computer 4 locates the route defined by the planned flight plan, with respect to the prohibited zone. To do this, when the information received is not supplemented by a definition of the contour of the zone, the computer 4 will search for this information in its database 9 and access the definition of the planned flight plan, which is for example stored in the automatic piloting device 14 (step 22).

Figure 3:
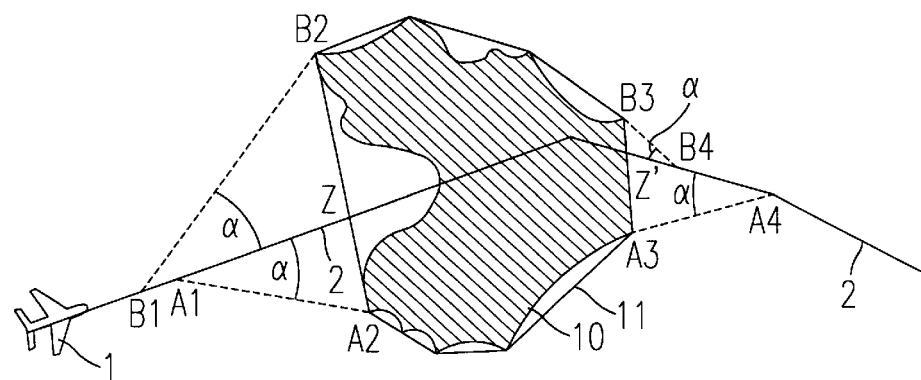
FIG. 3 shows a prohibited zone situated on the route of an aerodyne so as to illustrate the avoidance method.

If the aerodyne is not going to enter the prohibited zone, the analysis of the information supplied by the data transmission device 15 and by the MMI 6 is continued by returning to the start 20 of the algorithm. In the contrary case, in step 23 the computer 4 sends a message intended for the display 7 so as to warn the pilot that the route 2 to be travelled by the aerodyne 1 traverses a prohibited zone 10 (FIG. 3). This information can be supplemented by the the displaying on the screen 7 of the map of the overflown region, overlaid with an indication of the prohibited zone and possibly of its characteristics.

The computer next triggers the computation of an avoidance trajectory (step 24) which consists firstly in modelling the contours of the prohibited zone 10. This modelling consists in likening the contour of the zone 10 to a polygon, and in then eliminating the concave corners of the polygon and the excessively short sides, so as to obtain an entirely convex polygon 11.

Next it is necessary to determine the port B1-B2 and starboard A1-A2 portions of route for exiting the planned route so as to avoid the prohibited zone 10. For this purpose, the computer 4 positions the planned route 2 with respect to the modelled contours of the zone 10. These portions of route deviate from the planned route 2 by a predetermined angle $\alpha$ of 45 degrees or 30 degrees depending on the air regulations in force in the region overflown, and meet up respectively with the points B2, A2 of the polygon 11 which are closest to the planned route 2 on either side of the point of entry Z of the planned route 2 into the polygon 11.

However, it may prove to be impossible to determine the exit portions of route, when the aerodyne 1 lies too close to the prohibited zone 10. This situation occurs when the angle of exit from the initial route which makes it possible to avoid the zone is greater than a predetermined angle $\alpha$. When this case occurs, the computer 4 executes the algorithm starting from step 29 whereat is triggered the displaying of a message "automatic avoidance impossible".

In the contrary case, the computer 4 next determines the port B3-B4 and starboard A3-A4 portions of route for returning to the planned route 2. These portions of route meet up with the planned route at an angle $\alpha$ and are connected to the polygon 11 respectively at the points B3, A3 closest to the planned route 2, on either side of the point of exit Z' of the planned route 2 from the polygon 11.

To fully determine the starboard A1-A4 and port B1-B4 routes for avoiding the prohibited zone 10, it is next sufficient to connect the starboard A1-A2 and port B1-B2 exit portions of route respectively to the starboard A3-A4 and port B3-B4 return portions of route via the portions of contour A2-A3, B2-B3 of the polygon 11 connecting the points A2 and A3, and B2 and B3 respectively.

Since the starboard A1 and port B1 route exit points can be different, as can the starboard A4 and port B4 points of return to the planned route, it is important to reconstruct avoidance routes having the same end points. Thus, if A1 is nearer to the zone than B1, as in FIG. 3, the segment B1-A1 is added to the starboard trajectory A1-A2-A3-A4. Likewise, if the point of return B4 is closer to the zone than A4, the segment B4-A4 is added to the port trajectory B1-B2-B3-B4.

Next it is necessary to choose one of the two avoidance routes, starboard A1-A4 and port B1-B4, thus determined. To do this, the computer 4 computes the length of each of the two new routes B1-A1-A2-A3-A4, B1-B2-B3-B4-A4 so as to select the shorter, and if these two new routes are of equal length, that which lies windward of the zone 10 is chosen.

The avoidance route selected makes it possible to modify the initial flight plan supplied by the automatic piloting device 14, which can be displayed on the screen 7, with request for confirmation by the pilot.

In step 25, the computer 4 waits for the confirmation by the pilot of the new flight plan including the avoidance route A1-A4 selected, doing so until the point of exit A1 from the initially planned route 2 has been passed (step 26). While waiting, the computer 4 computes and displays the value of the distance of this point of exit A1, having regard to the current position of the aerodyne 1, this value being periodically refreshed (step 27).

If, during this wait, the pilot has confirmed the new flight plan, the latter is sent to the automatic piloting device 14 in replacement for that 2 initially planned, which then becomes active (step 28). This new flight plan allows the automatic avoidance of the zone if the flight plan management and lateral-mode automatic piloting systems are functioning.

If the pilot has not confirmed the new flight plan before crossing the point of exit A1, in step 29 the computer 4 sends a message to the pilot to indicate that this point of exit has been passed and that avoidance of the zone is now impossible. Next, in step 30, it computes the distance between the current position of the aerodyne 1 and the entry point Z into the prohibited zone delimited by the polygon 12. So long as the aerodyne 1 has not reached the point Z, this distance is displayed with periodic refreshing (step 31). After this point Z has been crossed, the computer 4 sends an alert message which signals to the pilot that the aerodyne 1 is in a prohibited zone (step 32). The computer 4 then waits for the prohibited zone 10 to be exited, having regard to the position of the point of exit Z' from this zone, and also to the current position and to the speed of the aerodyne 1 (step 33), before returning to step 18 for acquiring data, with erasure of the alert message.

Before sending the new flight plan to the automatic piloting device, but after confirmation by the pilot, in step 28 the computer 4 computes the trajectory making it possible to follow this new flight plan, and in particular, the transition trajectories making it possible to pass from one section of route of the flight plan to another.

The transition at the change of heading points such as A1 and A4, off the contours of the polygonal zone 11, is carried out in the conventional manner from inside the turn, by determining a circle of predetermined radius tangential to the two sections of route to be connected.

When these are change of heading points belonging to the contour of the convex polygonal zone 11, it is not possible to make the change of heading from inside the turn, since this entails entering the prohibited zone 10. Hence, the computer 4 will, according to the invention, calculate a trajectory passing outside the turn and through the turn point.

Figure 5:
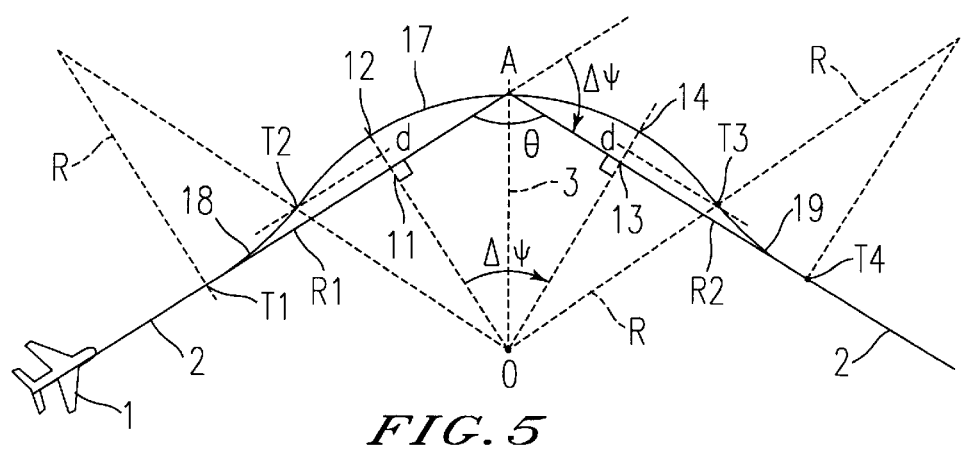
FIG. 5 shows the change of heading trajectory calculated by the piloting method according to the invention.

As represented in FIG. 5 showing two sections of route connected to a point A, forming an angle θ, and entailing a change of heading by an angle $\Delta\psi$, the computer 4 computes a curved trajectory 17 passing through the point A, whose turning centre O is situated on the interior bisector 3 of the angle θ and a distance R from the point A. This distance R corresponds to the turning radius of the curved trajectory 17, which is determined as a function of the speed of the aerodyne 1 which must make the turn with a predetermined angle of roll.

It is next necessary to determine the portions of linking trajectory 18, 19 between the rectilinear trajectories along the sections of route R1, R2, and the curved trajectory 17. The linking trajectory 18 which makes it possible to connect the section R1 with the curved trajectory 17 consists of a portion of curved trajectory with the same turning radius R, and is tangential at T1 to the section of route R1 and at T2 to the curved trajectory 17. Likewise, the linking trajectory 19 is a portion of curved trajectory with turning radius R, which is tangential at T3 to the curved trajectory 17 and at T4 to the section of route R2.

It should be noted that the points T2 and T3 correspond to the point of intersection of the curved trajectory 17 and the mid-perpendiculars of the segments d respectively delimited by the points of intersection I1, I2, I3, I4 of straight lines perpendicular to the sections of route R1, R2, passing through the turning centre O, with the sections of route R1, R2 and the curved trajectory 17.

Figure 6:
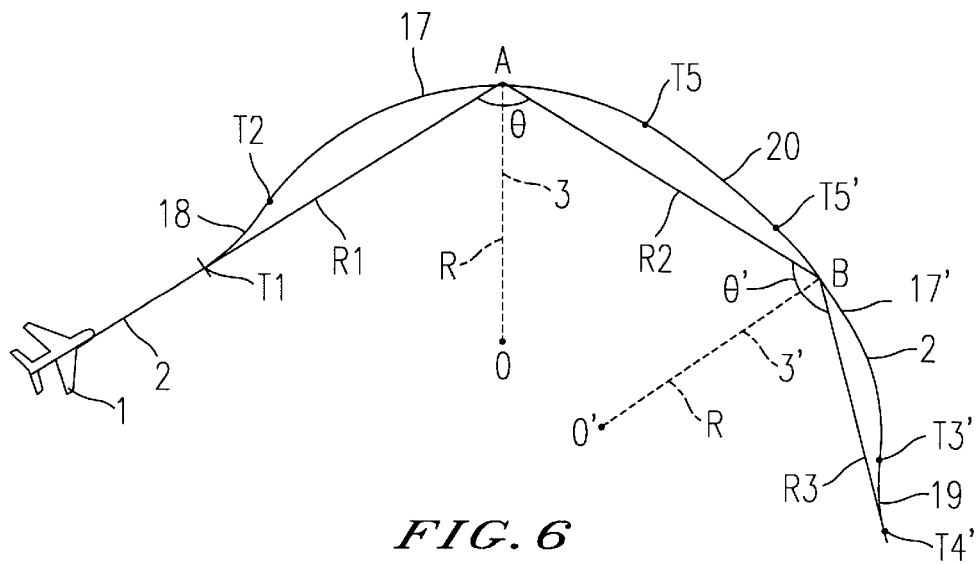
FIG. 6 shows the optimized transition trajectory in the case of two close changes of heading.

It may also be observed in FIG. 6 that the method according to the invention is perfectly suitable when there are two closely-spaced change of heading points A, B. This figure shows three sections of route R1, R2, R3 connected by the points A and B, and forming angles θ and θ' at A and B. As before, to make these two changes of heading, two curved trajectories 17, 17' are computed which pass respectively through A and B, and have a turning centre O, O' and a turning radius R, these two curved trajectories meeting up respectively with the sections of route R1 and R3 at the points T1 and T4' via two linking trajectories 18, 19'.

In the example of FIG. 6, it is not possible to connect the curved trajectories 17, 17' to the section of route R2, the latter being too short. In this case, it is sufficient to connect the two trajectories 17, 17' by a linking trajectory. 20 which is tangential to them at the points T5 and T5'.

Figure 4:
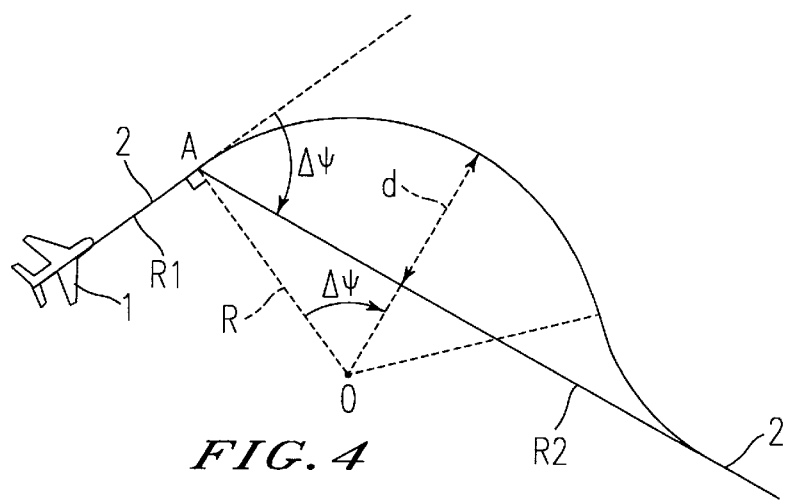
FIG. 4 diagrammatically represents the transition trajectory between two sections of route according to the prior art.

If the trajectory of FIG. 4 is compared with those illustrated by FIGS. 5 and 6, these latter deviate much less from the planned route R1-R2 and meet up with it much more rapidly, thus allowing more efficient surveillance and air control.

Thus, the deviation in the case of a bypass with conventional overflying of the point (FIG. 4) is equal to $R(1-\cos\Delta\psi)$. In the solution proposed by the invention, this deviation is now only $R(1-\cos\Delta\psi/2)$, i.e. around three times smaller at $\Delta\psi=90$ degrees.

Moreover, in the case of a short section of route R2, according to FIG. 6, we remain close to the planned route. By contrast, in the case of FIG. 4 it is clearly apparent that it will be difficult to meet up with the following section of route R3.

What is claimed is:

1. Method for piloting a vehicle for avoidance of a fixed zone, said fixed zone having at least a portion intersecting an initially planned route, wherein said method comprising the following successive steps:

modeling a polygon contour of the fixed zone approximating an actual contour of the fixed zone, said polygon having a succession of segments, with each segment being at least a predetermined length and extending between polygon corner points without bending toward an inner part of the fixed zone;

locating the planned route with respect to the polygon contour;

determining two avoidance routes as port and starboard side routes leaving the planned route before the fixed zone, with the port side route passing around a left side of the fixed zone and the starboard side route passing around a right side of the fixed zone, and the port side route and the starboard side route returning to the planned route after the fixed zone, each side route including an exit portion extending from an exit point on the planned route to a polygon corner point with each exit point being chosen in order that each exit portion forms a predetermined angle with the planned route at each exit point, a return portion extending from a polygon corner point to a return point on the planned route with each return point being chosen in order that each return portion forms a predetermined angle with the planned route at each return point, and portions of the polygon contour respectively connecting the port and starboard exit and return portions; and selecting one of the port and starboard side routes according to a predetermined criterion.

2. Method according to claim 1, wherein the port and starboard exit and return portions connect to corner points of the polygon contour which are situated on either side of the planned route and which are closest to points of intersection of the planned route and the polygon contour.

3. Method according to claim 2, wherein the determining of the two avoidance routes includes determining the two avoidance routes to have common exit and return points and then determining which of the two avoidance routes is shorter and using the shorter determination as the predetermined criterion for selecting an avoidance route.

4. Method according to claim 2, further comprising an initial step of searching for a section of the planned route traversing the fixed zone and computing a planned point of entry into the fixed zone, wherein the determining of the two avoidance routes is performed if the vehicle lies sufficiently far from the planned point of entry relative to current vehicle speed.

5. Method according to claim 2, further comprising confirming a selected avoidance route by a pilot and periodically computing and displaying a distance between a current position of the vehicle and a point of exit from the planned route to the selected avoidance route.

6. Method according to claim 2, further comprising periodically computing and displaying a distance between a current position of the vehicle and the fixed zone if the exit point from the planned route to a selected avoidance route has been passed without the selected avoidance route having been confirmed and displaying an alert message if the vehicle actually enters the fixed zone.

7. Method according to claim 1, wherein the determining of the two avoidance routes includes determining the two avoidance routes to have common exit and return points and then determining which of the two avoidance routes is shorter and using the shorter determination as the predetermined criterion for selecting an avoidance route.

8. Method according to claim 7, further comprising an initial step of searching for a section of the planned route traversing the fixed zone and computing a planned point of entry into the fixed zone, wherein the determining of the two avoidance routes is performed if the vehicle lies sufficiently far from the planned point of entry relative to current vehicle speed.

9. Method according to claim 7, further comprising confirming a selected avoidance route by a pilot and periodically computing and displaying a distance between a current position of the vehicle and a point of exit from the planned route to the selected avoidance route.

10. Method according to claim 7, further comprising periodically computing and displaying a distance between a current position of the vehicle and the fixed zone if the exit point from the planned route to a selected avoidance route has been passed without the selected avoidance route having been confirmed and displaying an alert message if the vehicle actually enters the fixed zone.

11. Method according to claim 1, further comprising an initial step of searching for a section of the planned route traversing the fixed zone and computing a planned point of entry into the fixed zone, wherein the determining of the two avoidance routes is performed if the vehicle lies sufficiently far from the planned point of entry relative to current vehicle speed.

12. Method according to claim 11, further comprising confirming a selected avoidance route by a pilot and periodically computing and displaying a distance between a current position of the vehicle and a point of exit from the planned route to the selected avoidance route.

13. Method according to claim 11, further comprising periodically computing and displaying a distance between a current position of the vehicle and the fixed zone if the exit point from the planned route to a selected avoidance route has been passed without the selected avoidance route having been confirmed and displaying an alert message if the vehicle actually enters the fixed zone.

14. Method according to claim 1, further comprising confirming a selected avoidance route by a pilot and periodically computing and displaying a distance between a current position of the vehicle and a point of exit from the planned route to the selected avoidance route.

15. Method according to claim 14, further comprising periodically computing and displaying a distance between a current position of the vehicle and the fixed zone if the exit point from the planned route to a selected avoidance route has been passed without the selected avoidance route having been confirmed and displaying an alert message if the vehicle actually enters the fixed zone.

16. Method according to claim 1, further comprising periodically computing and displaying a distance between a current position of the vehicle and the fixed zone if the exit point from the planned route to a selected avoidance route has been passed without the selected avoidance route having been confirmed and displaying an alert message if the vehicle actually enters the fixed zone.

17. Method according to claim 1, further comprising determining and having the vehicle follow a curved change of heading trajectory passing through said each polygon contour corner point for a selected avoidance route, wherein each curved change is determined as a curve passing through each corresponding polygon contour corner, with each determined curve having a turning center lying on an interior bisector of an angle formed by the polygon contour sections which meet to form each corresponding polygon contour corner point.

18. Method according to claim 17, wherein the curved change of heading trajectory determined for at least one of the polygon contour corner points is joined with a curved linking trajectory and the curved linking trajectory is determined as a linking curve having a same turning radius as that of the change of heading trajectory curve, with the linking curve being tangent to the change of heading trajectory curve and to a further portion of the selected avoidance route.

19. Method according to claim 17, further comprising linking a second curved change of heading trajectory corresponding to a second pentagon contour corner to a first change of heading trajectory corresponding to a first pentagon contour corner by a rectilinear linking trajectory tangent to the two curved change of heading trajectories when there are two closely-spaced changes of heading.

20. Method according to claim 17, further comprising computing a turning radius as a function of vehicle speed and to comply with a predetermined angle of roll of the vehicle.

* * * * *